(12) United States Patent
Selvaraj

(10) Patent No.: US 8,749,809 B2
(45) Date of Patent: Jun. 10, 2014

(54) APPROACH FOR MANAGING PRINTER DRIVER SETTINGS

(71) Applicant: Senthil K. Selvaraj, Cupertino, CA (US)

(72) Inventor: Senthil K. Selvaraj, Cupertino, CA (US)

(73) Assignee: Ricoh Company, Ltd., Ohta-Ku, Tokyo (JP)

( * ) Notice: Subject to any disclaimer, the term of this patent is extended or adjusted under 35 U.S.C. 154(b) by 0 days.

(21) Appl. No.: 13/773,595

(22) Filed: Feb. 21, 2013

(65) Prior Publication Data

US 2013/0155462 A1    Jun. 20, 2013

Related U.S. Application Data

(63) Continuation of application No. 11/415,695, filed on May 1, 2006, now Pat. No. 8,400,649.

(51) Int. Cl.
| | |
|---|---|
| *G06F 15/00* | (2006.01) |
| *G06K 1/00* | (2006.01) |
| *G06F 3/12* | (2006.01) |
| *G06K 15/00* | (2006.01) |
| *G06F 9/44* | (2006.01) |

(52) U.S. Cl.
CPC ........... *G06F 3/1297* (2013.01); *G06F 9/4411* (2013.01); *G06F 3/1205* (2013.01); *G06F 3/1284* (2013.01); *G06F 3/1257* (2013.01); *G06F 3/1292* (2013.01)
USPC ........... 358/1.14; 358/1.6; 358/1.9; 358/1.13; 358/1.15; 358/1.18

(58) Field of Classification Search
USPC ................ 358/1.6, 1.9, 1.13, 1.14, 1.15, 1.18
See application file for complete search history.

(56) References Cited

U.S. PATENT DOCUMENTS

| | | | | |
|---|---|---|---|---|
| 6,202,092 | B1 * | 3/2001 | Takimoto | 709/225 |
| 7,400,427 | B2 * | 7/2008 | Honma | 358/1.15 |
| 7,707,326 | B2 * | 4/2010 | Wanda | 710/19 |
| 2007/0247654 | A1 * | 10/2007 | Tian | 358/1.14 |

* cited by examiner

*Primary Examiner* — Firmin Backer
*Assistant Examiner* — Jonathan Beckley
(74) *Attorney, Agent, or Firm* — Hickman Palermo Truong Becker Bingham Wong LLP; Anjali Behal

(57) ABSTRACT

An approach is provided for managing printer driver settings. According to the approach, printer driver settings specified by a user for electronic data are maintained as a "print tag". Print tags may be stored, either local to a client device or remotely to a client device, and later retrieved when electronic data is to be printed again. This allows printer driver settings to be maintained on a per electronic data, e.g., electronic document, basis and re-used any number of times. It also allows printer driver settings to be persistently maintained when the execution of application programs and print drivers is terminated or in the event of failures. Print tags may be shared among different users to allow multiple users to easily and conveniently use the same printer driver settings to print the same electronic data, without each user having to manually enter the printer driver settings.

24 Claims, 5 Drawing Sheets

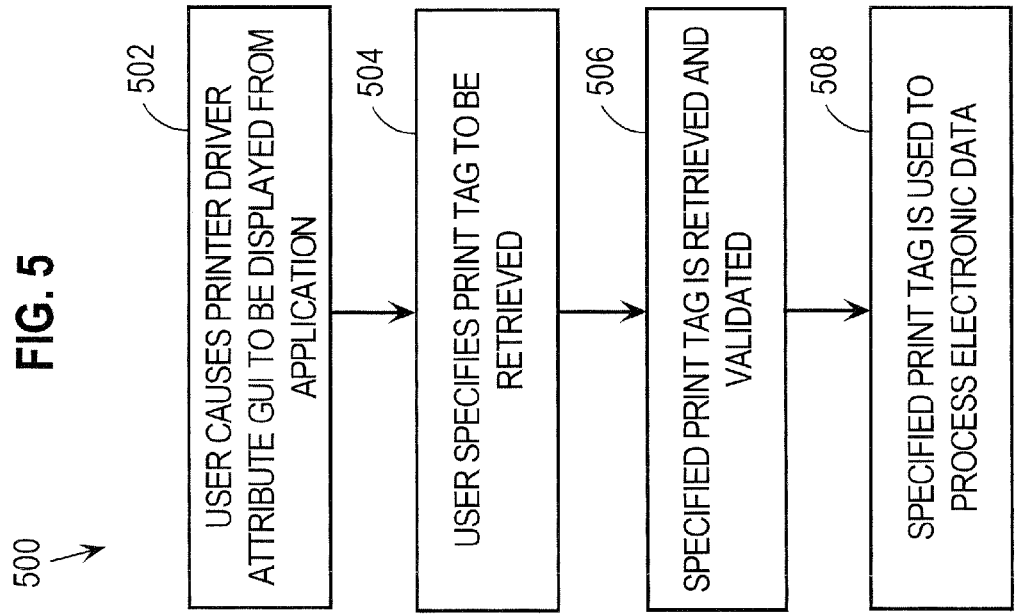

APPROACH FOR MANAGING PRINTER DRIVER SETTINGS

RELATED APPLICATIONS

This patent application is a continuation of U.S. patent application Ser. No. 11/415,695, filed May 1, 2006, entitled "Approach For Managing Printer Driver Settings", the entire content of which is hereby incorporated by reference in its entirety for all purposes.

FIELD OF THE INVENTION

This invention relates generally to printing electronic documents, and more specifically, to an approach for managing printer driver settings.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Most contemporary application programs that include the ability to print data use a printer driver to print data. A printer driver is a process that acts as a translator between a printing device and application programs that use the printing device. More specifically, a printer driver receives print data from an application program and formats the print data as required by the target printing device. One of the benefits of using printer drivers is that support for new features or functionality of a printing device can be provided by installing a new version of a printer driver without having to update application programs. Similarly, support for a new printing device can be provided by installing a new printer driver.

Printer drivers typically include a graphical user interface (GUI) to allow users to specify various printer driver settings. As used herein, the term "printer driver setting" refers to a value of a printer driver attribute. Examples of printer driver settings include, without limitation, input tray, paper size, page range (e.g., all, current or specific pages), layout orientation, pages per sheet, scaling, what to print (e.g., document, comments, styles, etc.) and print quality. Printer driver settings may also add data to an electronic document. For example, printer driver settings may specify that a watermark or confidential notice is to be printed on an electronic document. As another example, printer driver settings may specify that additional pages be printed with an electronic document, such as a license or notice page.

One of the issues with conventional printing drivers is that the printer driver settings are not persistent and must be manually specified each time an application program is executed. For example, suppose that a user wants to specify particular printer driver settings to be used to print a particular word processing document. The user conventionally selects an icon in the word processing program that is associated with printer driver settings. This causes the printer driver to display the GUI for specifying printer driver settings. The user selects the printer driver settings to be used to process the particular word processing document. For example, the user may specify a particular input tray, paper type, a page range, scaling and print quality to be used to process the particular word processing document. The particular word processing document is processed using the printer driver settings specified by the user. When the user wants to print the particular word processing document a second time, the user must again specify the printer driver settings, if the application program has been restarted. Similarly, when another user wants to print the same particular word processing document, for example on another computer, the other user must also manually specify the printer driver settings to be used to process the particular word processing document. This is very inefficient in situations where multiple users are working on and printing the same word processing documents.

Based on the foregoing, there is a need for an approach for managing printer driver settings that does not suffer from limitations of prior approaches for printing electronic documents. There is a particular need for an approach for managing printer driver settings that is more user friendly than conventional approaches for printing electronic documents.

SUMMARY

An approach is provided for managing printer driver settings. According to the approach, printer driver settings specified by a user for electronic data are maintained as a "print tag". Print tags may be stored, either local to a client device or remotely to a client device, and later retrieved when electronic data is to be printed again. This allows printer driver settings to be maintained on a per electronic data, e.g., electronic document, basis and re-used any number of times. It also allows printer driver settings to be persistently maintained when the execution of application programs and print drivers is terminated or in the event of failures. Print tags may be shared among different users to allow multiple users to easily and conveniently use the same printer driver settings to print the same electronic data, without each user having to manually enter the printer driver settings. This is particularly useful in situations where complex printer driver attributes are desired that are difficult and tedious to re-create.

According to one aspect of the invention, a computer-implemented method is provided for managing printer driver settings. According to the approach, a printer driver causes a graphical user interface to be displayed at a client device, wherein the graphical user interface allows users to specify printer driver settings values for a particular printing device. Particular printer driver settings values are received for the particular printing device from a first user via the graphical user interface. An indication to save the particular printer driver settings values specified by the first user is received from the first user via the graphical user interface. In response to receiving the indication from the first user to save the particular printer driver settings values, printer driver settings data is generated that specifies the particular printer driver settings values. The printer driver settings data is stored and the printer driver uses the particular printer driver settings values to process electronic data and cause a printed version of the electronic data to be printed at the particular printing device.

BRIEF DESCRIPTION OF THE DRAWINGS

In the figures of the accompanying drawings like reference numerals refer to similar elements.

FIG. 4 is a flow diagram that depicts an approach for saving printer driver attribute values according to an embodiment of the invention.

FIG. 5 is a flow diagram that depicts an approach for using saved printer driver attribute values according to an embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview

II. Print Tag Architecture

III. Print Tags

IV. Using Print Tags to Manage Printer Driver Settings

V. Document Authentication and Printer Driver Proxying

VI. Implementation Mechanisms

I. Overview

An approach is provided for managing printer driver settings. According to the approach, printer driver settings specified by a user for electronic data are maintained as a "print tag". Print tags may be stored, either local to a client device or remotely to a client device, and later retrieved when electronic data is to be printed again. This allows printer driver settings to be maintained on a per electronic data, e.g., electronic document, basis and re-used any number of times. It also allows printer driver settings to be persistently maintained when the execution of application programs and print drivers is terminated or in the event of failures. Print tags may be shared among different users to allow multiple users to easily and conveniently use the same printer driver settings to print the same electronic data, without each user having to manually enter the printer driver settings. This is particularly useful in situations where complex printer driver attributes are desired that are difficult and tedious to re-create.

II. Print Tag Architecture

Figure 1:
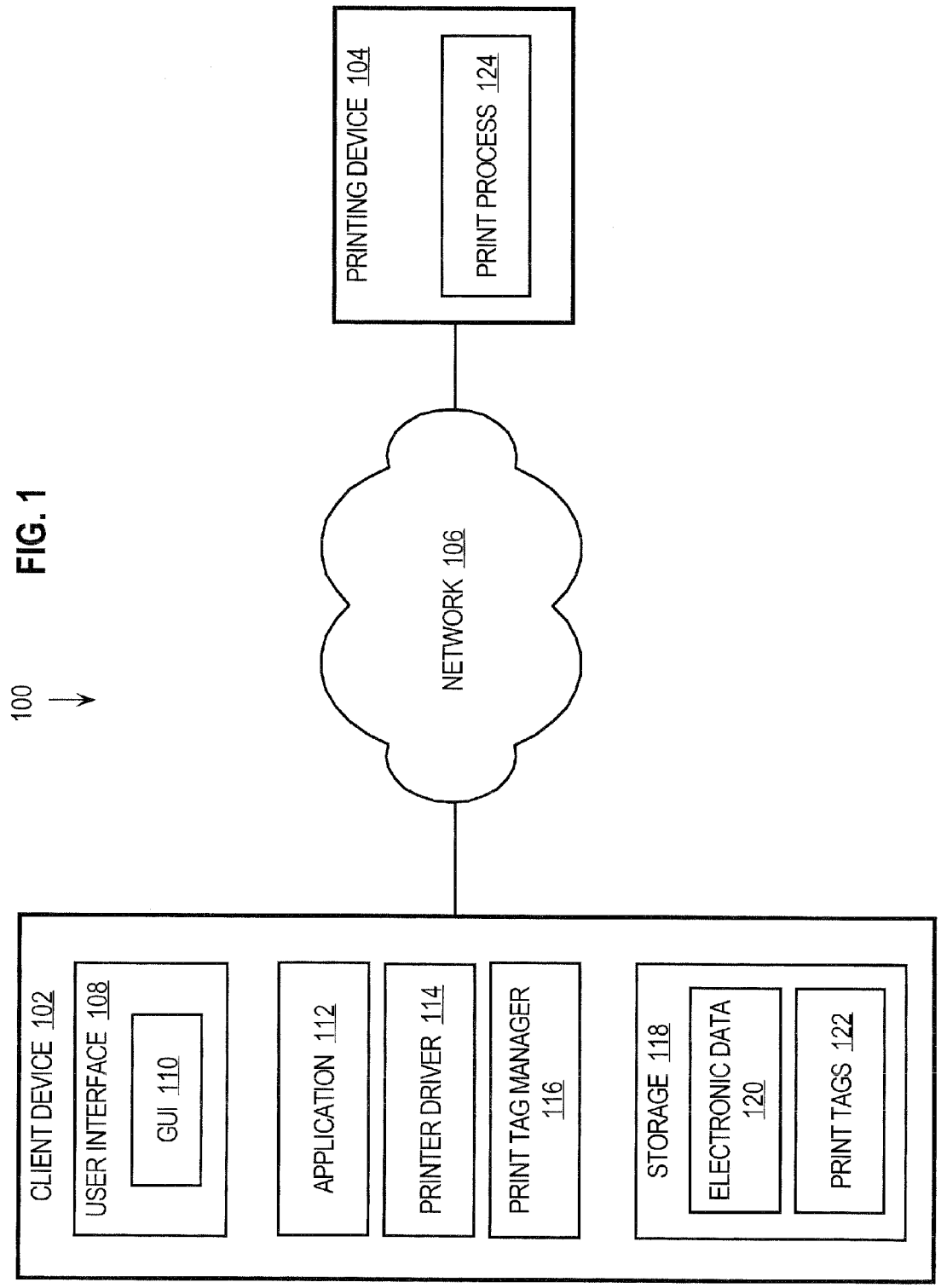
FIG. 1 is a block diagram that depicts an arrangement for managing printer driver settings according to an embodiment of the invention.

FIG. 1 is a block diagram that depicts an arrangement 100 for managing printer driver settings according to an embodiment of the invention. Arrangement 100 includes a client device 102 communicatively coupled to a printing device 104 via a network 106. Network 106 may be implemented by any medium or mechanism that provides for the exchange of data between client device 102 and printing device 104. Examples of network 106 include, without limitation, a network such as a Local Area Network (LAN), Wide Area Network (WAN), Ethernet or the Internet, or one or more terrestrial, satellite or wireless links. Client device 102 and printing device 104 may also communicate via a direct communications link that is not depicted in FIG. 1 or described herein for purposes of explanation.

Client device 102 may be any type of client device, depending upon a particular implementation, and the approach is not limited to any type of client device. Examples of client device 102 include, without limitation, a personal computer, a workstation, a personal digital assistant (PDA), a cell phone and any other type of mobile or wireless device. Client device 102 includes a user interface 108 with a graphical user interface (GUI) 110, an application 112, a printer driver 114, a print tag manager 116 and a storage 118. Client device 102 may include additional modules and processes not depicted in FIG. 1 or described herein, depending upon the implementation.

User interface 108 conveys information to a user and receives user input. Examples of user interface 108 include a display as well as input devices, such as a keyboard, keypad, mouse, touchpad, or any combination thereof. GUI 110 is generated and displayed on user interface 108. Examples of application 112 include a word processor, a spreadsheet program and an email program, but the invention is not limited to these particular example applications. Printer driver 114 and a print tag manager 116 are described in more detail hereinafter. Storage 118 may be any type of storage, for example, volatile memory, such as a random access memory (RAM), a non-volatile memory, such as flash memory or one or more hard disks, or any combination of volatile and non-volatile memory.

Printing device 104 may be any type of device capable of generating printed versions of electronic data, such as electronic documents. Examples of printing device 104 include, without limitation, a printer and a multi-function peripherals (MFPs). Printing device 104 may include other modules and processes not depicted in FIG. 1 or described herein, depending upon the implementation.

III. Print Tags

Print tags may be implemented using a wide variety of data structures and formats, depending upon a particular implementation, and the invention is not limited to print tags in any particular structure or format. For example, print tags 122 may be in XML format, print schema format, or in a format that complies with the CIP4 standard, such as JDF. Print tags may be stored in a secure manner. For example, Print tags 122 may be encrypted when stored on storage 118.

IV. Using Print Tags to Manage Printer Driver Settings

Figure 2A:
FIGS. 2A and 2B depict an example printing preferences screen that allows a user to save and retrieve print tags, according to an embodiment of the invention.
Figure 2B:
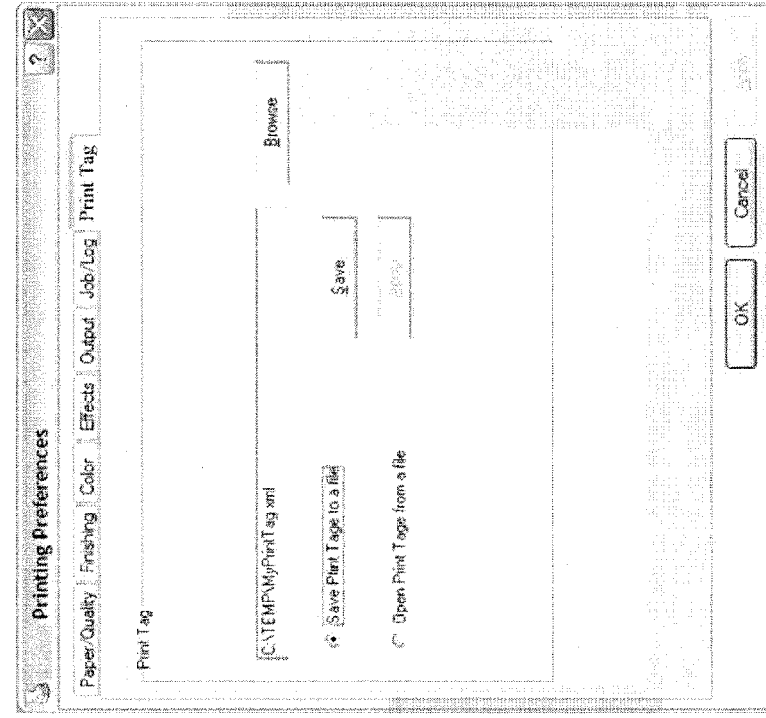

FIGS. 2A and 2B depict an example printing preferences screen 200 that allows a user to save and retrieve print tags, according to an embodiment of the invention. Printing preferences screen 200 includes tabs for specifying printer driver settings that include paper/quality, finishing, color, effects, output and job/log in separate tabs. The particular printer driver settings depicted in FIGS. 2A and 2B are example printer driver settings and the invention is not limited to the particular printer driver settings depicts in FIGS. 2A and 2B. As depicted in FIG. 2A, printing preferences screen 200 includes a print tag tab (currently selected) that allows a user to save or retrieve print tags. In FIG. 2A, the save option has been selected from the print tag tab and the current print tag, i.e., the current printer driver settings, will be saved to a file named "MyPrintTag.xml" at the location "C:\TEMP\". In FIG. 2B, the open option has been selected from the print tag tab and the print tag contained in the file "MyPrintTag.xml" at the location "C:\TEMP\" will be retrieved. Thus, as depicted in FIGS. 2A and 2B, a user may save and retrieve print tags using a print tag tab option in printing preferences screen 200.

In FIGS. 2A and 2B the files that contain the print tags are depicted as XML files, as indicated by the ".xml" file extension. XML is one example format of the files that contain the printer driver settings and the invention is not limited to the XML format. According to one embodiment of the invention, printing preferences screen 200 is generated by printer driver 114.

Print tags 122 may be used with any number of electronic data and any number of users. For example, suppose that a user creates a print tag for an electronic document that the user is editing in a word processor. The print tag specifies the particular print driver settings that the user wants to be uses when the electronic document is printed. For example, the print tag may specify a particular print layout and particular print parameters that are to be used by the print driver to process the electronic document. The print tag may also specify, for example, a watermark, a confidentiality notice or other notification that is to be printed in or with the electronic document.

The user may make the print tag available to other users. For example, the user may email the electronic document and print tag to other users, so that if those other users need to print the electronic document, they will have all the printer driver settings pre-specified for them in the print tag. As another example, the user may store the electronic document and print tag to a central repository that can be accessed by other users.

Figure 3:
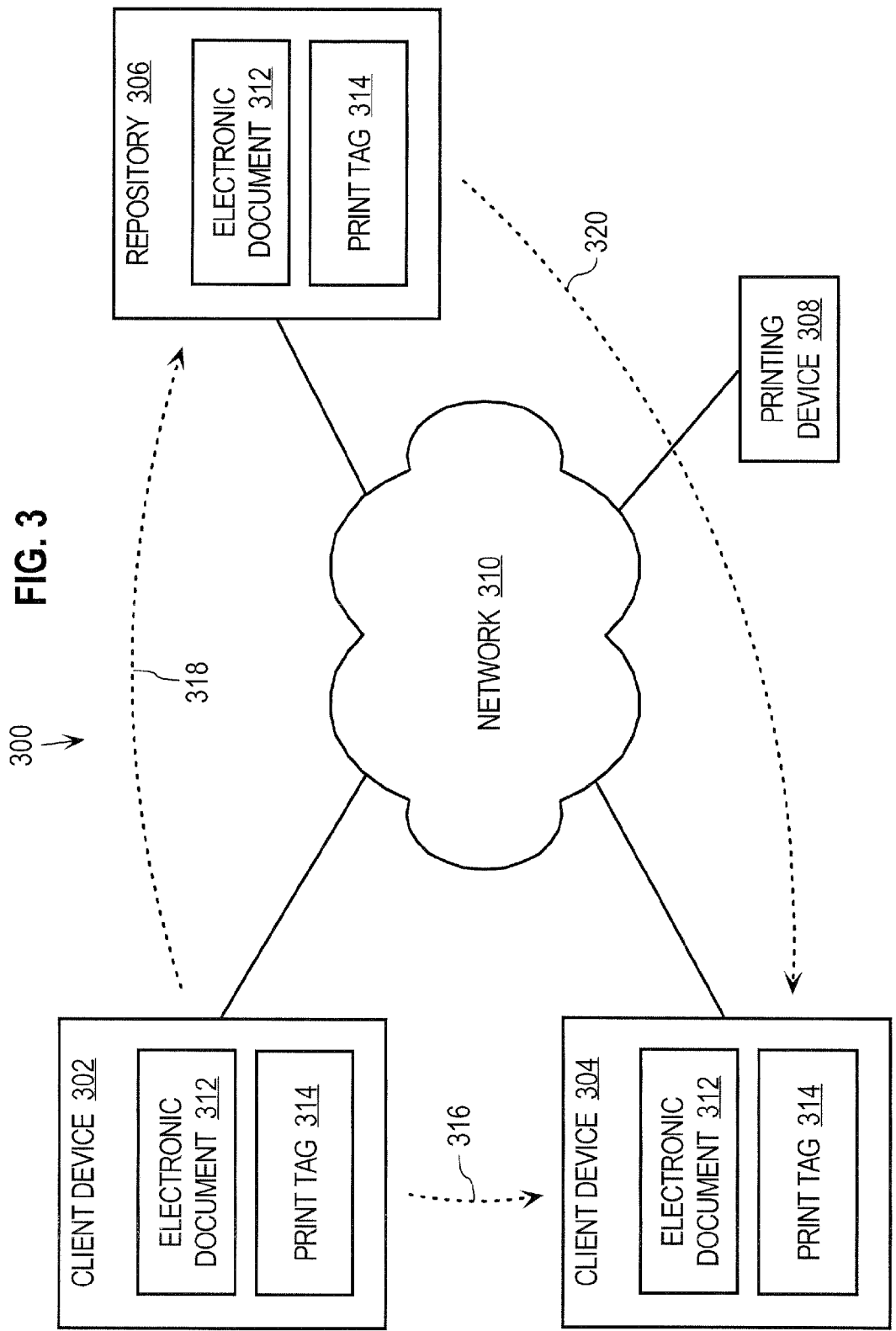
FIG. 3 is a block diagram of an arrangement that provides for local and central storage of print tags, according to one embodiment of the invention.

FIG. 3 is a block diagram of an arrangement 300 that provides for local and central storage of print tags, according to one embodiment of the invention. Arrangement 300 includes client devices 302, 304, a repository 306 and a printing device 308, communicatively coupled via a network 310. Suppose that a user creates an electronic document 312 on client device 302. The user also creates a print tag 314 for electronic document 312. As depicted by line 316, electronic document 312 and print tag 314 may be provided from client device 302 directly to client device 304 via network 310 or any other connection. For example, client devices 302, 304 may each include email clients and a user of client device 302 emails electronic document 312 and print tag 314 to a user of client device 304. The user of client device 304 may then use all of the printer driver settings from print tag 314 that were established by the original user to print electronic document 312 on printing device 308. As indicated by line 318, electronic document 312 and print tag 314 may instead be provided from client device 302 to and stored on repository 306. Repository 306 may be any type of network device or element, for example a database system, a server or even another client device. Client device 304 may then retrieve electronic document 312 and print tag 314 from repository 306. For example, a user of client device 304 may issue a request to repository 306 for electronic document 312 and print tag 314 and electronic document 312 and print tag 314 are provided to client device 304 via network 310 or another connection.

FIG. 4 is a flow diagram 400 that depicts an approach for saving printer driver attribute values according to an embodiment of the invention. In step 402, a user causes a printer driver attribute GUI to be displayed from an application. For example, a user may select a user interface object in GUI 110 generated by application 112 associated with specifying printer driver attribute values. The user selection of the user interface object causes printer driver 114 to display a GUI where printer driver attribute values can be specified by a user. For example, the printer driver 114 may cause the printing preferences screen 200 of FIG. 2A to be displayed.

In step 404, the user specifies printer driver attribute values. For example, a user may specify printer driver attribute values using the various tabs provided on printing preferences screen 200. In step 406, the user causes the specified printer driver attribute values to be saved into a file, for example by using the save option in printing preferences screen 200 depicted in FIG. 2A. In response to detecting the user input, printer driver 114 causes the printer driver attribute values to be saved into the file specified by the user.

FIG. 5 is a flow diagram 500 that depicts an approach for using saved printer driver attribute values according to an embodiment of the invention. In step 502, a user causes a printer driver attribute GUI to be displayed. For example, a user may select a user interface object in GUI 110 generated by application 112. In response to the user selection, printer driver 114 causes the printer driver attribute GUI to be displayed, such as the printing preferences screen 200 of FIG. 2B.

In step 504, the user specifies a print tag to be retrieved. For example, a user may select the print tag tab on printing preferences screen 200 and then specify the name of a file containing a desired print tag. In step 506, the specified print tag is retrieved and validated. The particular validation performed may vary based upon a particular implementation and the invention is not limited to any particular validation. For example, printer driver 114 may determine whether the printer driver attribute values contained in the retrieved print tag are compatible with the corresponding printing device. If any of the printer driver attribute values contained in the retrieved print tag are not compatible with the corresponding printing device, then printer driver 114 may ignorer or override an incompatible printer driver attribute value to allow the electronic document to be processed. For example, suppose that a retrieved print tag specifies that duplex printing (double sided) is to be used. Suppose further that the particular printing device to be used does not support duplex printing. In this situation, printer driver 114 may cause the electronic data to be printed using non-duplex printing. Printer driver 114 may also be configured to cause a message to be displayed on GUI 110 to notify the user of the condition. Printer driver 114 may also be configured to cause a message to be displayed on GUI 110 and give the user the option to either proceed and have the incompatibility overridden or to cancel the processing.

In step 508, the specified print tag is used to process the electronic data. For example, in response to the user entering the name of a file that contains a print tag, printer driver 114 retrieves the printer driver attribute values from file specified by the user. Printer driver 114 then uses the printer driver attribute values to process an electronic document. A print tag may also provide a starting set of printer driver attribute values that can be modified for a particular situation. The modified printer driver attribute values may then be saved as a separate print tag. For example, a user might retrieve a set of printer driver attribute values that the user knows are close to what the user wants and then change, for example, a watermark specified by the printer driver attribute values. This can save the user a significant amount of time, particularly when the user only needs to make changes to a few attribute values of an existing print tag.

V. Document Authentication and Printer Driver Proxying

According to one embodiment of the invention, print tags may be used to provide document authentication. A print tag is created that causes some identifying information to be printed with an electronic document. The identifying information may be any type of information that may be used to determine that a printed document is authentic. For example, the identifying information may be a graphic, a watermark, special text or a special code. A printed electronic document is not considered to be authentic unless it contains the identifying information. The print tag is stored on repository 306 in a manner that requires a user to be authenticated before the user can retrieve the print tag from repository 306. Any type of authentication mechanism may be employed to authenticate users, depending upon a particular implementation. For example, a user of client device 302 may be required to log onto repository 306 to retrieve the print tag which, when processed by printer driver 114, causes the identifying information to be printed on an electronic document.

There may be situations where a client device is not configured with a printer driver or a client device is configured with a print driver, but the print driver is not configured with the print tag functionality described herein. In these situations, print tag manager 116 may act as a printer driver proxy and perform any or all of the print tag management functions described herein. For example, suppose that client device 102 is not configured with printer driver 114, or client device 102 is configured with printer driver 114, but printer driver 114 is not configured to perform the print tag management functions described herein. Print tag manager 116 may be configured to receive electronic data from application 112, apply the printer driver settings values from a print tag to the electronic data, and then provide the electronic data to either printer driver 114 or printing device 104.

VI. Implementation Mechanisms

The approach for managing printer driver settings as described herein is very flexible and user friendly. It allows complex printer driver settings to be persistently maintained and shared among multiple users. This is particularly useful in situations where electronic documents are shared among multiple users, for example in project applications.

Figure 6:
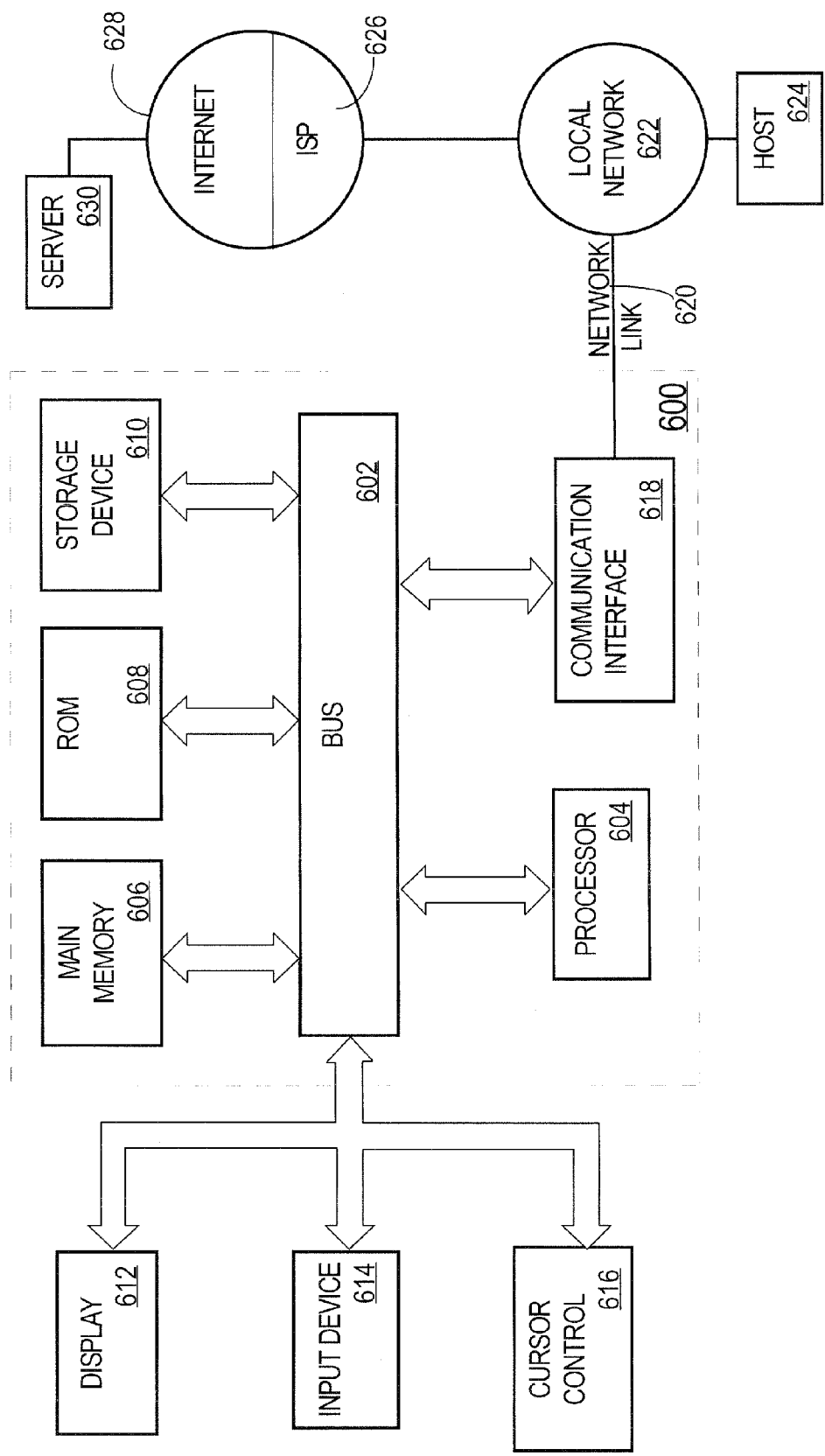
FIG. 6 is a block diagram of a computer system on which embodiments of the invention may be implemented.

The approach may be implemented on any type of computing architecture or platform and the invention is not limited to any particular computing architecture or platform. For purposes of explanation, FIG. 6 is a block diagram that illustrates an example computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing printer driver settings, the computer-implemented method comprising:

receiving, from a first user via a graphical user interface, an indication to retrieve printer driver settings data;

in response to receiving the indication from the first user to retrieve the printer driver settings data, retrieving the printer driver settings data;

a printer driver validating particular printer driver settings data values contained in the retrieved printer driver settings data with respect to a particular printing device by determining whether any of particular printer driver settings values contained in the printer driver settings data are not currently supported by the particular printing device based on current capabilities of the particular printing device;

in response to determining that any of the particular printer driver settings values contained in the printer driver settings data are not currently supported by the particular printing device based on current capabilities of the particular printing device, the printer driver performing one or more of i) notifying the first user via the graphical user interface that one or more printer driver settings values contained in the printer driver settings data are not currently supported by the particular printing device and allowing the first user to correct incompatibilities or ii) automatically using one or more substitute printer driver settings values in place of the printer driver settings values that are not currently supported by the particular printing device, wherein the one or more substitute printer driver settings values are currently supported by the particular printing device.

2. The computer-implemented method as recited in claim 1, further comprising:

causing the particular printer driver settings values of the printer driver settings data to be displayed on the graphical user interface, wherein the first user can modify the particular printer driver settings values of the printer driver settings data via the graphical user interface to generate modified particular printer driver settings values; and the printer driver using the modified particular printer driver settings values to process electronic data and cause a printed version of the electronic data to be printed at the particular printing device.

3. The computer-implemented method as recited in claim 2, further comprising:

receiving, from the first user via the graphical user interface, an indication to save the modified particular printer driver settings values specified by the first user;

in response to receiving the indication from the first user to save the modified particular printer driver settings values, generating modified printer driver settings data that specifies the modified particular printer driver settings values; and causing the modified printer driver settings data to be stored.

4. The computer-implemented method as recited in claim 3, wherein the indication to save the modified particular printer driver settings values includes file name data that identifies a file and the causing the modified printer driver settings data to be stored includes causing the modified printer driver settings data to be stored to the file identified by the file name data included in the indication to save.

5. The computer-implemented method as recited in claim 2, wherein the printer driver settings data includes identifying information that is printed on the printed version of the electronic data.

6. The computer-implemented method as recited in claim 5, further comprising causing the printer driver settings data to be stored on a network device, wherein access to the printer driver settings data on the network device requires user authentication.

7. The computer-implemented method as recited in claim 2, wherein the electronic data represents one or more of an electronic document, an email or an electronic spreadsheet.

8. The computer-implemented method as recited in claim 1, further comprising sending the printer driver settings data to a second user on a second client device, wherein the second client device is different than a client device at which the graphical user interface is displayed.

9. One or more non-transitory computer-readable storage media for managing printer driver settings, the computer-readable storage media carrying instructions which, when processed by one or more processors, cause:

receiving, from a first user via a graphical user interface, an indication to retrieve printer driver settings data;

in response to receiving the indication from the first user to retrieve the printer driver settings data, retrieving the printer driver settings data;

a printer driver validating particular printer driver settings data values contained in the retrieved printer driver settings data with respect to a particular printing device by determining whether any of particular printer driver settings values contained in the printer driver settings data are not currently supported by the particular printing device based on current capabilities of the particular printing device;

in response to determining that any of the particular printer driver settings values contained in the printer driver settings data are not currently supported by the particular printing device based on current capabilities of the particular printing device, the printer driver performing one or more of i) notifying the first user via the graphical user interface that one or more printer driver settings values contained in the printer driver settings data are not currently supported by the particular printing device and allowing the first user to correct incompatibilities or ii) automatically using one or more substitute printer driver settings values in place of the printer driver settings values that are not currently supported by the particular printing device, wherein the one or more substitute printer driver settings values are currently supported by the particular printing device.

10. The non-transitory computer-readable storage media as recited in claim 9, further comprising additional instructions which, when processed by the one or more processors, cause:

causing the particular printer driver settings values of the printer driver settings data to be displayed on the graphical user interface, wherein the first user can modify the particular printer driver settings values of the printer driver settings data via the graphical user interface to generate modified particular printer driver settings values; and the printer driver using the modified particular printer driver settings values to process electronic data and cause a printed version of the electronic data to be printed at the particular printing device.

11. The non-transitory computer-readable storage media as recited in claim 10, further comprising additional instructions which, when processed by the one or more processors, cause:

receiving, from the first user via the graphical user interface, an indication to save the modified particular printer driver settings values specified by the first user;

in response to receiving the indication from the first user to save the modified particular printer driver settings values, generating modified printer driver settings data that specifies the modified particular printer driver settings values; and causing the modified printer driver settings data to be stored.

12. The non-transitory computer-readable storage media as recited in claim 11, wherein the indication to save the modified particular printer driver settings values includes file name data that identifies a file and the causing the modified printer driver settings data to be stored includes causing the modified printer driver settings data to be stored to the file identified by the file name data included in the indication to save.

13. The non-transitory computer-readable storage media as recited in claim 10, wherein the printer driver settings data includes identifying information that is printed on the printed version of the electronic data.

14. The non-transitory computer-readable storage media as recited in claim 13, further comprising further comprising additional instructions which, when processed by the one or more processors, cause:

causing the printer driver settings data to be stored on a network device, wherein access to the printer driver settings data on the network device requires user authentication.

15. The non-transitory computer-readable storage media as recited in claim 10, wherein the electronic data represents one or more of an electronic document, an email or an electronic spreadsheet.

16. The non-transitory computer-readable storage media as recited in claim 9, further comprising additional instructions which, when processed by the one or more processors, cause:

sending the printer driver settings data to a second user on a second client device, wherein the second client device is different than a client device at which the graphical user interface is displayed.

17. An apparatus for managing printer driver settings, the apparatus comprising:

a printer driver configured to:

receive, from a first user via a graphical user interface, an indication to retrieve printer driver settings data;

in response to receiving the indication from the first user to retrieve the printer driver settings data, retrieve the printer driver settings data;

validate particular printer driver settings data values contained in the retrieved printer driver settings data with respect to a particular printing device by determining whether any of the particular printer driver settings values contained in the printer driver settings data are not currently supported by the particular printing device based on current capabilities of the particular printing device;

in response to determining that any of the particular printer driver settings values contained in the printer driver settings data are not currently supported by the particular printing device based on current capabilities of the particular printing device, perform one or more of i) notifying the first user via the graphical user interface that one or more printer driver settings values contained in the printer driver settings data are not currently supported by the particular printing device and allowing the first user to correct incompatibilities or ii) automatically using one or more substitute printer driver settings values in place of the printer driver settings values that are not currently supported by the particular printing device, wherein the one or more substitute printer driver settings values are currently supported by the particular printing device.

18. The apparatus as recited in claim 17, wherein the printer driver is further configured to:

cause the particular printer driver settings values of the printer driver settings data to be displayed on the graphical user interface, wherein the first user can modify the particular printer driver settings values of the printer driver settings data via the graphical user interface to generate modified particular printer driver settings values; and use the modified particular printer driver settings values to process electronic data and cause a printed version of the electronic data to be printed at the particular printing device.

19. The apparatus as recited in claim 18, wherein the printer driver is further configured to:

receive, from the first user via the graphical user interface, an indication to save the modified particular printer driver settings values specified by the first user;

in response to receiving the indication from the first user to save the modified particular printer driver settings values, generate modified printer driver settings data that specifies the modified particular printer driver settings values; and cause the modified printer driver settings data to be stored.

20. The apparatus as recited in claim 19, wherein the indication to save the modified particular printer driver settings values includes file name data that identifies a file and the causing the modified printer driver settings data to be stored includes causing the modified printer driver settings data to be stored to the file identified by the file name data included in the indication to save.

21. The apparatus as recited in claim 18, wherein the printer driver settings data includes identifying information that is printed on the printed version of the electronic data.

22. The apparatus as recited in claim 21, wherein the printer driver is further configured to:
   cause the printer driver settings data to be stored on a network device, wherein access to the printer driver settings data on the network device requires user authentication.

23. The apparatus as recited in claim 18, wherein the electronic data represents one or more of an electronic document, an email or an electronic spreadsheet.

24. The apparatus as recited in claim 17, wherein the printer driver is further configured to:
   send the printer driver settings data to a second user on a second client device, wherein the second client device is different than a client device at which the graphical user interface is displayed.

\* \* \* \* \*